M. L. SENTER.
WRENCH.
APPLICATION FILED JUNE 13, 1908.
929,504.
Patented July 27, 1909.
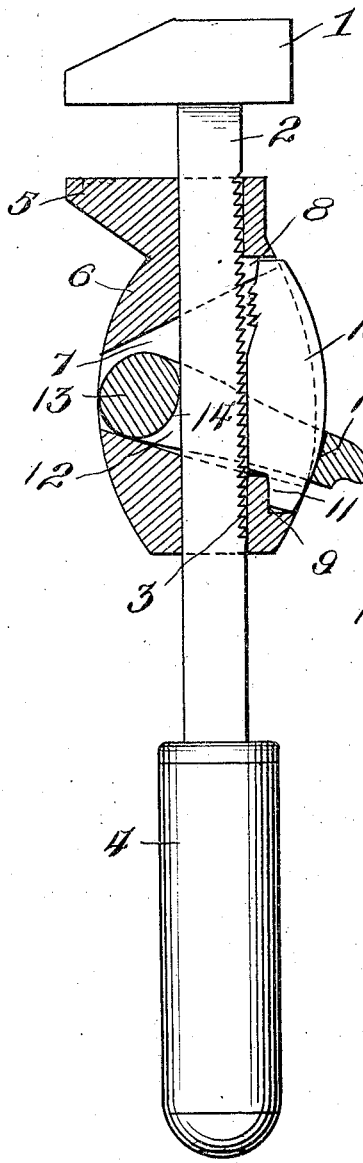
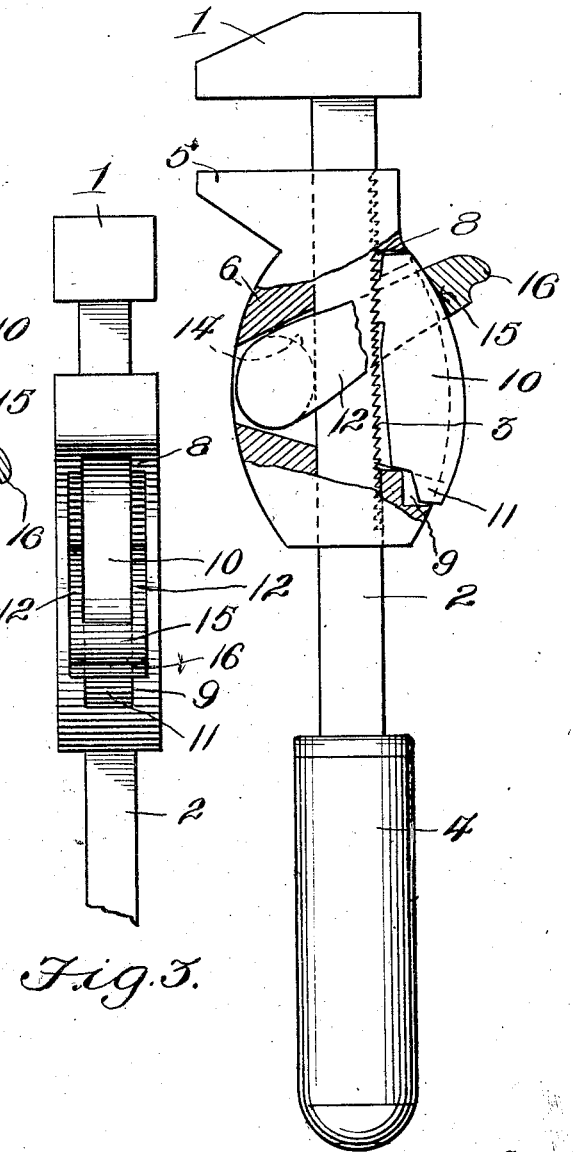

UNITED STATES PATENT OFFICE.

MADISON L. SENTER, OF CLINTWOOD, VIRGINIA.

WRENCH.

No. 929,504.　　　　Specification of Letters Patent.　　　　Patented July 27, 1909.

Application filed June 13, 1908. Serial No. 438,333.

*To all whom it may concern:*

Be it known that I, MADISON L. SENTER, a citizen of the United States, residing at Clintwood, in the county of Dickenson and State of Virginia, have invented new and useful Improvements in Wrenches, of which the following is a specification.

This invention relates to monkey wrenches, and the object of the invention is to provide a wrench having a slidable jaw carrying a loosely mounted dog and provided with a yoke having a cam face upon one of its connecting ends and adapted to engage the teeth of the dog with the teeth of the stationary jaw when the yoke is swung in one direction and to disengage the dog when the yoke is swung in the opposite direction, thus providing for a quick and accurate adjustment of the sliding jaw.

To these ends the invention resides in the novel construction of elements and their arrangement in operative combination, hereinafter fully described and claimed.

In the drawings, Figure 1 is a side view of my improved wrench, the sliding jaw and yoke being illustrated in section. Fig. 2 is a similar view, the dog being illustrated in locked position upon the stationary jaw. Fig. 3 is an end elevation of a portion of the wrench.

In the accompanying drawings the numeral 1 designates the stationary jaw of my improved wrench. The jaw 1 is provided with the usual shank 2 having one of its faces provided with teeth 3, and having its lower extremity provided with a handle 4. Slidably mounted upon the shank 2 of the stationary jaw is a movable jaw 5, provided with a longitudinal bore coinciding with the cross sectional contour of the shank 2 upon which it is positioned and adapted to slide. The shank 6 of the movable jaw 5 may be provided with arcuate enlargements upon both of its faces opposite the faces of the shank 2. The face of the jaw 5 opposite the toothed face of the shank 2 is provided with a centrally arranged cut away portion 7, communicating with the face of the opposite side of the sliding jaw. The side walls of this cut away portion are substantially vertical and smooth, while the top and bottom walls are arranged at an inclined angle as clearly illustrated in the figures of the drawings. This cut away 7 communicates with a smaller recess 8 upon the face of the jaw adjacent the teeth of the stationary member and with a reduced offset 9 alining with the opening 8 and directly opposite and communicating with the lower inclined wall of the cut away portion 7. The reduced cut away portion 8 is adapted to communicate with the opening in the shank 6 adapted for the reception of the shank 2.

Positioned within the openings 8 and 9 of the slidable jaw 5 and between the side walls formed by the opening 7 of the shank 6, is a dog 10. This dog 10 has its inner face provided adjacent one of its ends for a suitable distance with a series of projecting teeth which are adapted to contact and engage the teeth 3 of the shank 2. A portion of the face of the dog 10 upon which the teeth are formed is smooth and the said portion is positioned a sufficient distance away from the teeth of the dog so as to be at all times prevented from contacting the teeth 3 of the shank 2. The lower portion of the dog 10 is provided with an angular cut away portion so as to provide a finger 11 which is positioned within the opening or cut away portion 9 and engages one of the walls of the said portion so as to prevent the dog 10 contacting the teeth 3 of the shank 2 when this portion of the dog is swung into contact with the said wall, in a manner hereinafter to be described. The outer face of the dog 10 is rounded at a greater radius than the arcuate face of the shank 5, for a purpose now to be described. Positioned within the opening 7 is an operating lever 12 comprising a yoke and adapted to straddle the shank 2 and the dog 10. The inner connecting member of the yoke 12 comprises a cam member 13, which is adapted to contact with the smooth or inner face of the shank 2, while the opposite connecting member of the arms of the yoke 12 has an inner curved face 15 which is adapted at all times to contact with the curved outer face of the dog 10. The outer connecting portion of the arms of the yoke 12 is also provided with a projection 16 comprising a finger hold through the medium of which the yoke is swung in either direction to bring the teeth of the dog into contact with the teeth of the shank 2 or to bring the finger 11 into contact with the wall of the recess 9 so as to force the teeth of the dog out of engagement with the teeth of the shank and thus provide for the free movement of the shank 2.

From the above description it will be seen that I have provided a simple, durable and effective monkey wrench, one wherein the sliding jaw may be readily locked or unlocked by a simple rotation of a yoke, and one in which when the engaging dog is not in locked position upon the stationary shank the movable dog may be freely and easily slid upon the shank.

Having thus fully described the invention what is claimed as new is:

1. In a wrench, the combination of a stationary jaw and a shank having teeth upon one of its faces, and a sliding jaw upon said shank, said sliding jaw being provided with an opening having slanting top and bottom walls, a dog having projecting teeth upon one of its ends loosely mounted in said opening adjacent the teeth of the stationary shank, and a yoke in said opening having a cam face adapted to engage the smooth face of the stationary shank while its opposite connecting face being adapted to contact the outer face of the dog to force the teeth of the dog into and out of contact with the teeth of the shank.

2. The combination with a stationary jaw having its shank provided with teeth upon one of its faces, of a sliding jaw having a transverse opening, the top and bottom walls of the opening being inclined, the face of the jaw adjacent the shank being provided with a reduced cut away portion communicating with the shank and the upper wall of the cut away portion of the sliding jaw, the lower wall of the cut away portion being provided with a depression, a dog having projecting teeth upon its upper inner face and a tongue upon its lower end, the dog adapted to have its upper portion positioned within the upper cut away portion of the sliding jaw and to have its tongue positioned within the recess of the sliding jaw, and a yoke having a cam face adapted to contact with the smooth face of the stationary jaw and another face adapted to contact with the outer face of the dog to force the teeth of the dog into and out of engagement with the teeth of the shank.

In testimony whereof I affix my signature in presence of two witnesses.

MADISON L. SENTER.

Witnesses:
J. C. DAMRAU,
G. A. COLEMAN.